United States Patent
Renfors et al.

(10) Patent No.: US 12,395,387 B2
(45) Date of Patent: Aug. 19, 2025

(54) MODULATION METHOD FOR POWER-EFFICIENT TRANSMISSIONS

(71) Applicant: Nokia Technologies Oy, Espoo (FI)

(72) Inventors: Markku Renfors, Nokia (FI); Ismael Peruga Nasarre, Oulu (FI); Toni Aleksi Levanen, Tampere (FI); Juha Yli-Kaakinen, Tampere (FI); Mikko Valkama, Nokia (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 24 days.

(21) Appl. No.: 18/683,897

(22) PCT Filed: Aug. 18, 2021

(86) PCT No.: PCT/EP2021/072916
§ 371 (c)(1),
(2) Date: Feb. 15, 2024

(87) PCT Pub. No.: WO2023/020689
PCT Pub. Date: Feb. 23, 2023

(65) Prior Publication Data
US 2024/0364567 A1 Oct. 31, 2024

(51) Int. Cl.
*H04L 27/20* (2006.01)
*H04L 27/26* (2006.01)

(52) U.S. Cl.
CPC ...... *H04L 27/2007* (2013.01); *H04L 27/2636* (2013.01)

(58) Field of Classification Search
CPC ..... H04L 27/18; H04L 27/20; H04L 27/2003; H04L 27/2007; H04L 27/2014;
(Continued)

(56) References Cited

U.S. PATENT DOCUMENTS

| | | | | |
|---|---|---|---|---|
| 5,285,165 A | * | 2/1994 | Renfors | H03H 17/02 327/551 |
| 6,434,188 B1 | * | 8/2002 | Hwang | H04L 27/2602 375/222 |

(Continued)

*Primary Examiner* — James M Perez
(74) *Attorney, Agent, or Firm* — Carter, DeLuca & Farrell LLP

(57) ABSTRACT

This document discloses a solution for modulating and demodulating signals transferred over a communication channel. According to an aspect, a method comprises: storing a database for mapping rules for mapping a block of N bits into M modulation symbol phase transitions, wherein a phase transition between consecutive modulation symbols is limited to less than or equal to $\mp\pi/2$, wherein M is smaller than N, and wherein M is the smallest number required for realizing 2N different phase-transition combinations; determining an initial phase; acquiring a block of N bits and modulating the block of N bits into M phase symbol transitions from the initial phase by using bit values of the block of N bits and the mapping rules, thus acquiring M modulation symbols; performing said determining, acquiring, and modulating for further blocks of N bits, thus acquiring a sequence of K modulation symbols; allocating the sequence of K modulation symbols to sub-carriers of a multi-carrier symbol and causing transmission of the multi-carrier symbol over a radio interface.

6 Claims, 8 Drawing Sheets

(58) Field of Classification Search
CPC ............. H04L 27/2017; H04L 27/201; H04L 27/2032; H04L 27/2053; H04L 27/206; H04L 27/2067; H04L 27/2078; H04L 27/2082; H04L 27/26; H04L 27/2626; H04L 27/2627; H04L 27/2634; H04L 27/2636

See application file for complete search history.

(56) References Cited

U.S. PATENT DOCUMENTS

| | | | | |
|---|---|---|---|---|
| 7,254,179 B2* | 8/2007 | Yoshida | ............... | H04L 27/2615 375/296 |
| 7,310,522 B2* | 12/2007 | Geile | ................. | H04L 27/2647 375/E7.002 |
| 7,751,509 B1* | 7/2010 | Lehnert | ................ | H04L 5/0021 375/348 |
| 7,936,851 B2* | 5/2011 | Renfors | .................. | H04B 3/14 375/346 |
| 7,991,091 B2* | 8/2011 | Suzuki | ............... | H04L 27/2605 375/348 |
| 8,009,761 B2* | 8/2011 | Lai | ..................... | H04L 27/2017 375/296 |
| 8,045,635 B2* | 10/2011 | Ko | ...................... | H04L 27/2602 341/94 |
| 8,208,522 B2* | 6/2012 | Tupala | ................ | H04L 27/2666 370/208 |
| 8,594,512 B2* | 11/2013 | Coelho | ............. | H04B 10/5561 398/208 |
| 8,675,751 B2* | 3/2014 | Cannon | .............. | H04L 27/3461 375/325 |
| 8,817,909 B2* | 8/2014 | Goe | ........................ | H03C 5/00 375/295 |
| 8,873,655 B2* | 10/2014 | Rao | .................... | H04L 27/2634 375/259 |
| 8,948,230 B1* | 2/2015 | Fan | .................... | H04L 27/0008 375/259 |
| 8,995,568 B1* | 3/2015 | Wu | ....................... | H04K 1/006 375/295 |
| 9,313,063 B1* | 4/2016 | Jia | .................... | H04L 25/03006 |
| 9,544,171 B2* | 1/2017 | Berardinelli | ........ | H04L 27/2607 |
| 9,680,666 B2* | 6/2017 | Wiley | ................ | H04L 25/0272 |
| 9,787,553 B1* | 10/2017 | Drozdzowski | ...... | H04L 27/2647 |
| 9,813,276 B2* | 11/2017 | Jungnickel | ......... | H04L 27/2644 |
| 9,942,011 B2* | 4/2018 | Tang | ................ | H04L 25/03834 |
| 9,954,712 B1* | 4/2018 | Arambepola | ........ | H04L 5/0048 |
| 10,218,557 B2* | 2/2019 | Fei | .......................... | H04L 27/38 |
| 10,299,136 B2* | 5/2019 | Hasegawa | .......... | H04W 72/541 |
| 10,742,356 B2* | 8/2020 | Renfors | .............. | H04L 27/2607 |
| 10,764,102 B2* | 9/2020 | Sahin | ................ | H04B 1/7085 |
| 10,771,297 B2* | 9/2020 | Lin | ......................... | H04L 27/26 |
| 10,778,476 B2* | 9/2020 | Renfors | ............ | H04L 27/26265 |
| 10,938,457 B2* | 3/2021 | Murakami | ........ | H04L 25/03171 |
| 11,558,881 B2* | 1/2023 | Simonen | .............. | H04W 72/20 |
| 11,611,459 B1* | 3/2023 | Ma | .................... | H04L 27/26134 |
| 11,616,594 B2* | 3/2023 | Saggar | ................ | H04W 72/044 370/330 |
| 11,664,867 B2* | 5/2023 | Levanen | ............... | H04B 7/0404 375/267 |
| 11,695,609 B2* | 7/2023 | Wang | ............... | H04L 27/2634 375/262 |
| 11,843,405 B2* | 12/2023 | Levanen | ................. | H04B 1/10 |
| 11,855,811 B1* | 12/2023 | Levanen | ........... | H04L 25/03891 |
| 11,888,664 B2* | 1/2024 | Levanen | ........... | H04L 27/26025 |
| 11,949,543 B1* | 4/2024 | Sayed Hassan | .... | H04L 27/2075 |
| 12,244,446 B2* | 3/2025 | Lopez | ................ | H04L 27/2602 |
| 12,294,983 B2* | 5/2025 | Peruga Nasarre | ......................... H04L 27/26412 |
| 2002/0181607 A1* | 12/2002 | Izumi | ................ | H04L 27/2634 375/295 |
| 2003/0165131 A1* | 9/2003 | Liang | ................ | H04B 1/7103 370/335 |
| 2004/0066802 A1* | 4/2004 | Ro | ....................... | H04L 27/2607 370/208 |
| 2004/0114671 A1* | 6/2004 | Inogai | .................... | H04L 5/026 375/146 |
| 2004/0252772 A1* | 12/2004 | Renfors | .................. | H04L 27/26 375/260 |
| 2006/0087961 A1* | 4/2006 | Chang | ................. | H04L 27/2607 370/210 |
| 2007/0121706 A1* | 5/2007 | Nakamura | ............... | H04J 13/00 375/147 |
| 2007/0189404 A1* | 8/2007 | Baum | ................... | H04L 27/2613 375/260 |
| 2008/0043827 A1* | 2/2008 | Renfors | .................... | H04B 3/14 375/230 |
| 2008/0043871 A1* | 2/2008 | Latouche | ............... | H04L 27/186 375/261 |
| 2008/0123774 A1* | 5/2008 | Goe | ......................... | H03C 5/00 375/297 |
| 2009/0052577 A1* | 2/2009 | Wang | ................... | H04L 1/0643 375/299 |
| 2009/0161804 A1* | 6/2009 | Chrabieh | .............. | H04J 11/0066 375/346 |
| 2010/0002783 A1* | 1/2010 | Qi | ....................... | H04L 25/0238 375/260 |
| 2010/0091904 A1* | 4/2010 | Wang | .................... | H04B 7/043 375/296 |
| 2010/0239046 A1* | 9/2010 | Chun | ................... | H04L 27/2614 375/295 |
| 2011/0222865 A1* | 9/2011 | Coelho | .................. | H04B 10/60 398/208 |
| 2011/0275338 A1* | 11/2011 | Seshadri | ............. | H04L 27/2003 455/205 |
| 2012/0119830 A1* | 5/2012 | Sayers | .................. | H03F 1/0294 330/124 R |
| 2012/0166119 A1* | 6/2012 | Nentwig | ............. | H04L 25/0384 702/66 |
| 2012/0213312 A1* | 8/2012 | Futatsugi | .......... | H04L 25/03828 375/296 |
| 2014/0044439 A1* | 2/2014 | Coelho | ............. | H04B 10/5561 398/208 |
| 2015/0163036 A1* | 6/2015 | Thomas | ................ | H04W 72/23 370/281 |
| 2015/0333944 A1* | 11/2015 | Bae | ....................... | H04B 17/354 375/296 |
| 2015/0372843 A1* | 12/2015 | Bala | ................. | H04L 27/26538 375/295 |
| 2016/0006478 A1* | 1/2016 | Bruchner | ............... | H04B 1/709 375/150 |
| 2017/0026156 A1* | 1/2017 | Thomas | ............. | H04W 72/0446 |
| 2017/0201403 A1* | 7/2017 | Johansson | ........... | H04L 27/2007 |
| 2017/0288921 A1* | 10/2017 | Akhavan | ........... | H04L 25/03853 |
| 2017/0295047 A1* | 10/2017 | Zeng | ................... | H04L 27/3411 |
| 2019/0158261 A1* | 5/2019 | Hwang | ............... | H04L 5/0053 |
| 2019/0158342 A1* | 5/2019 | Lee | ...................... | H04L 27/3458 |
| 2019/0222451 A1* | 7/2019 | Yang | ................. | H04L 27/2613 |
| 2019/0280818 A1* | 9/2019 | Renfors | ............. | H04L 27/26524 |
| 2019/0327120 A1* | 10/2019 | Yun | ...................... | H04L 27/2621 |
| 2020/0007361 A1* | 1/2020 | Renfors | ............... | H04L 27/2626 |
| 2020/0235970 A1* | 7/2020 | Hasegawa | ............... | H04L 27/2636 |
| 2021/0021308 A1* | 1/2021 | Kimura | ..................... | H04L 27/00 |
| 2021/0067388 A1* | 3/2021 | Hasegawa | ........... | H04L 27/2626 |
| 2021/0203538 A1* | 7/2021 | Kim | .................... | H04L 27/26526 |
| 2022/0038319 A1* | 2/2022 | Kuchi | ................. | H04L 27/2636 |
| 2022/0052887 A1* | 2/2022 | Levitsky | ............. | H04L 25/4917 |
| 2022/0132482 A1* | 4/2022 | Gokceli | ............... | H04W 72/044 |
| 2022/0377759 A1* | 11/2022 | Simonen | ............... | H04W 72/20 |
| 2023/0106724 A1* | 4/2023 | Levanen | .................. | H04B 1/10 375/267 |
| 2023/0208485 A1* | 6/2023 | Tiirola | .................. | H04B 7/0617 370/329 |
| 2023/0327734 A1* | 10/2023 | Talvitie | ................ | H04B 7/0617 370/329 |
| 2023/0344691 A1* | 10/2023 | Levanen | ............. | H04L 27/26265 |
| 2023/0370101 A1* | 11/2023 | Levanen | ............... | H04L 27/2691 |
| 2024/0007333 A1* | 1/2024 | Levanen | ........... | H04L 25/03891 |
| 2024/0072948 A1* | 2/2024 | Tiirola | ..................... | H04L 5/001 |
| 2024/0111015 A1* | 4/2024 | Talvitie | ..................... | G01S 5/0284 |
| 2024/0129170 A1* | 4/2024 | Peruga Nasarre | ......................... H04L 27/26265 |

(56) References Cited

U.S. PATENT DOCUMENTS

| | | | |
|---|---|---|---|
| 2024/0154737 A1* | 5/2024 | Peruga Nasarre | H04L 25/0228 |
| 2024/0155551 A1* | 5/2024 | Morales Ferre | H04W 64/006 |
| 2024/0178937 A1* | 5/2024 | Kuo | H04L 27/2627 |
| 2024/0187148 A1* | 6/2024 | Peruga Nasarre | H04L 5/0007 |
| 2024/0196349 A1* | 6/2024 | Talvitie | H04W 48/12 |
| 2024/0214249 A1* | 6/2024 | Suresh | H04L 27/0008 |
| 2024/0224185 A1* | 7/2024 | Gokceli | H04W 52/0216 |
| 2024/0267166 A1* | 8/2024 | Pajukoski | H04L 25/03834 |
| 2024/0364567 A1* | 10/2024 | Renfors | H04L 27/2007 |
| 2024/0372766 A1* | 11/2024 | Luo | H04L 27/2602 |
| 2024/0372770 A1* | 11/2024 | Peruga | H04L 27/2675 |
| 2024/0389085 A1* | 11/2024 | Peruga Nasarre | H04W 72/0453 |
| 2024/0406048 A1* | 12/2024 | Yli-Kaakinen | H03C 5/00 |
| 2025/0047431 A1* | 2/2025 | Yli-Kaakinen | H04L 25/03834 |
| 2025/0113344 A1* | 4/2025 | Peruga Nasarre | H04W 72/20 |

\* cited by examiner

FIRST PHASE TRANSITION   SECOND PHASE TRANSITION

MODULATION METHOD FOR POWER-EFFICIENT TRANSMISSIONS

RELATED APPLICATION

This application claims priority to PCT Patent Application No. PCT/EP2021/072916, filed 18, Aug. 2021, which is incorporated herein by reference in its entirety.

FIELD

Various embodiments described herein relate to the field of wireless communications and, particularly, to a modulation method that provides a signal model reducing a peak-to-average power ratio (PAPR).

BACKGROUND

Modern cellular communication systems are based on multi-carrier communications such as orthogonal frequency-division multiplexing (OFDM) and its variants called in some literature virtual multi-carrier waveforms such as single-carrier frequency division multiple access (SC-FDMA) or discrete Fourier transform spread OFDM (DFT-S-OFDM). One problem of OFDM-based communications has been peak-to-average power ratio (PAPR) of a transmitted signal. High PAPR increases power consumption of a power amplifier amplifying the transmitted signal. Particularly in battery-operated terminal devices, high power consumption is not desired. Therefore, efficiency of the power amplifier has been a driving force when developing cellular communication systems. There are many different factors that affect the PAPR, and a signal model is one such factor. A modulation method affects the signal model and is thus one of the factors affecting the PAPR. Modern cellular communication systems use various forms of phase-shift keying such as quadrature phase shift keying (QPSK) or 8-PSK, or quadrature amplitude modulation (QAM) such as 16-QAM or 64 QAM as a higher-order modulation method.

Above-described modulation methods require phase-coherence in demodulation and detection at a receiver. Conventionally, reference signals are delivered from the transmitter to the receiver to acquire the phase-coherence. The reference signals increase signaling overhead. Non-coherent modulation methods have also been studied in the literature. An example of the non-coherent modulation method is differential QPSK (DQPSK). In the DQPSK modulation, a modulator at the transmitter encodes data by producing a certain phase shift relative to a previous symbol. Similarly, by using the phase of the preceding symbol in this way, the demodulation circuitry analyzes the phase of a current symbol. Since the information is carried by the phase difference between consecutive symbols, the receiver does not need phase coherence with the transmitter.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus comprising means for performing: storing a database for mapping rules for mapping a block of N bits into M modulation symbol phase transitions, wherein a phase transition between consecutive modulation symbols is limited to less than or equal to $\mp\pi/2$, wherein M is smaller than N, and wherein M is the smallest number required for realizing 2N different phase-transition combinations; determining an initial phase; acquiring a block of N bits and modulating the block of N bits into M phase symbol transitions from the initial phase by using bit values of the block of N bits and the mapping rules, thus acquiring M modulation symbols; performing said determining, acquiring, and modulating for further blocks of N bits, thus acquiring a sequence of K modulation symbols; allocating the sequence of K modulation symbols to sub-carriers of a multi-carrier symbol and causing transmission of the multi-carrier symbol over a radio interface.

In an embodiment, a phase transition between consecutive symbols is either $0$, $-\pi/2$, or $+\pi/2$.

In an embodiment, N=3 and M=2.

In an embodiment, the mapping rules define a non-symmetric trellis.

In an embodiment, the multicarrier symbol is a discrete Fourier transform spread orthogonal frequency-division multiplexing, DFT-S-OFDM, symbol.

In an embodiment, the initial phase is a phase of the last symbol in a preceding block of N bits or, if the block of N bits is the first when generating the sequence of K modulation symbols, an initial phase for the sequence of K modulation symbols.

In an embodiment, the means are configured to arrange the sequence of K modulation symbols to start and end at the same phase $\varphi$ by taking into the last block N' bits where N' is greater than zero but less than N, and finding, by using the mapping rules on the basis of the bit value or values in said N' bits, M phase transitions that both carry the bit value or values of said N' bits and realize phase $\varphi$ at the end of the last modulation symbol of the sequence of K modulation symbols.

In an embodiment, the means are configured to generate another multi-carrier symbol preceding said multicarrier symbol, to insert, between the multi-carrier symbol and said another multi-carrier symbol, a cyclic prefix of the multi-carrier symbol, to determine a phase at an end of said another multi-carrier symbol, and to perform phase rotation of the multi-carrier symbol towards the determined phase at the end of said another multi-carrier symbol such that a phase shift between a start of the multi-carrier symbol and the determined phase at the end of said another multi-carrier symbol is equal to or smaller than $\mp\pi/2$.

In an embodiment, the means are configured to oversample the sequence of K modulation symbols by interpolating phase samples between the modulation symbols, to transform the sequence of modulation symbols via a Fourier transform, to eliminate frequency samples that are outside a passband of the multi-carrier symbol, and to perform inverse Fourier transform on the remaining frequency samples.

According to an aspect, there is provided an apparatus comprising means for performing: storing a database for mapping rules for mapping a block of N bits into M modulation symbol phase transitions, wherein a phase transition between consecutive modulation symbols is limited to less than or equal to $\mp\pi/2$, wherein M is smaller than N, and wherein M is the smallest number required for realizing 2N different phase-transition combinations; receiving a multi-carrier symbol comprising a sequence of K modulation symbols and acquiring M modulation symbols from the sequence of K modulation symbols; determining an initial phase before a phase transition leading to the first symbol in the M modulation symbols; generating, by using the mapping rules, a trellis from the determined initial phase to the possible phase states of the M modulation symbols; measuring a phase of the first symbol of the M modulation symbols, computing a distance of the measured phase to each possible phase state of the first modulation symbol in the trellis, and selecting a phase state having the shortest distance to the measured phase; determining, on the basis of the mapping rules and the selected phase state, possible states of the second symbol of the M modulation symbols, measuring a phase of the second symbol of the M modulation symbols, computing a distance of the measured phase to each possible phase state of the second modulation symbol, and selecting a phase state having the shortest distance to the measured phase; upon determining phases of all M modulation symbols, mapping phase transitions between the initial phase and the selected phases of the all M modulation symbols to N bits by using the mapping rules and outputting the N bits.

In an embodiment, the means are further configured to perform phase error correction by reducing a phase proportional to the distance between the measured phase of the first symbol and the selected phase state from a phase of the second symbol before measuring the phase of the second symbol;

In an embodiment, the means are configured to estimate the phase error from the sequence of modulation symbols without a reference signal.

In an embodiment, the mapping rules allow a phase transition between consecutive modulation symbols to be either 0, $\pi/2$, or $+\pi/2$.

In an embodiment, M=2 and N=3.

In an embodiment, the means are configured to omit computation of distance to such phase states of the M modulation symbols that are not allowed by the mapping rules.

In an embodiment, the means comprise at least one processor and at least one memory including computer program code, the at least one memory and computer program code configured to, with the at least one processor, cause the performance of the apparatus.

According to an aspect, there is provided a telecommunication signal comprising a multi-carrier symbol carrying a sequence of K modulation symbols generated according to mapping rules for mapping a block of N bits into M modulation symbol phase transitions, wherein a phase transition between consecutive modulation symbols is limited to less than or equal to $\mp\pi/2$, wherein M is smaller than N, and wherein M is the smallest number required for realizing 2N different phase-transition combinations, and wherein the sequence of K modulation symbols comprises c*M modulation symbols where c is an integer greater than one.

In an embodiment, the telecommunication signal has a single-carrier waveform.

According to an aspect, there is provided a method comprising: storing, by an apparatus, a database for mapping rules for mapping a block of N bits into M modulation symbol phase transitions, wherein a phase transition between consecutive modulation symbols is limited to less than or equal to $\mp\pi/2$, wherein M is smaller than N, and wherein M is the smallest number required for realizing 2N different phase-transition combinations; determining, by the apparatus, an initial phase; acquiring, by the apparatus, a block of N bits and modulating the block of N bits into M phase symbol transitions from the initial phase by using bit values of the block of N bits and the mapping rules, thus acquiring M modulation symbols; performing, by the apparatus, said determining, acquiring, and modulating for further blocks of N bits, thus acquiring a sequence of K modulation symbols; allocating, by the apparatus, the sequence of K modulation symbols to sub-carriers of a multi-carrier symbol and causing transmission of the multi-carrier symbol over a radio interface.

In an embodiment, a phase transition between consecutive symbols is either 0, $-\pi/2$, or $+\pi/2$.

In an embodiment, N=3 and M=2.

In an embodiment, the mapping rules define a non-symmetric trellis.

In an embodiment, the multicarrier symbol is a discrete Fourier transform spread orthogonal frequency-division multiplexing, DFT-S-OFDM, symbol.

In an embodiment, the initial phase is a phase of the last symbol in a preceding block of N bits or, if the block of N bits is the first when generating the sequence of K modulation symbols, an initial phase for the sequence of K modulation symbols.

In an embodiment, the apparatus arranges the sequence of K modulation symbols to start and end at the same phase $\varphi$ by taking into the last block N' bits where N' is greater than zero but less than N, and finds, by using the mapping rules on the basis of the bit value or values in said N' bits, M phase transitions that both carry the bit value or values of said N' bits and realize phase $\varphi$ at the end of the last modulation symbol of the sequence of K modulation symbols.

In an embodiment, the apparatus generates another multi-carrier symbol preceding said multicarrier symbol, to insert, between the multi-carrier symbol and said another multi-carrier symbol, a cyclic prefix of the multi-carrier symbol, determines a phase at an end of said another multi-carrier symbol, and performs phase rotation of the multi-carrier symbol towards the determined phase at the end of said another multi-carrier symbol such that a phase shift between a start of the multi-carrier symbol and the determined phase at the end of said another multi-carrier symbol is equal to or smaller than $\mp\pi/2$.

In an embodiment, the apparatus oversamples the sequence of K modulation symbols by interpolating phase samples between the modulation symbols, transforms the sequence of modulation symbols via a Fourier transform, eliminates frequency samples that are outside a passband of the multi-carrier symbol, and performs inverse Fourier transform on the remaining frequency samples.

According to an aspect, there is provided a method comprising: storing, by an apparatus, a database for mapping rules for mapping a block of N bits into M modulation symbol phase transitions, wherein a phase transition between consecutive modulation symbols is limited to less than or equal to $\mp\pi/2$, wherein M is smaller than N, and wherein M is the smallest number required for realizing 2N different phase-transition combinations; receiving, by the apparatus, a multi-carrier symbol comprising a sequence of K modulation symbols and acquiring M modulation symbols from the sequence of K modulation symbols; determining, by the apparatus, an initial phase before a phase transition leading to the first symbol in the M modulation symbols; generating, by using the mapping rules, a trellis from the determined initial phase to the possible phase states of the M modulation symbols; measuring a phase of the first symbol of the M modulation symbols, computing a distance of the measured phase to each possible phase state of the first modulation symbol in the trellis, and selecting a phase state having the shortest distance to the measured phase; determining, on the basis of the mapping rules and the selected phase state, possible states of the second symbol of the M modulation symbols, measuring a phase of the second symbol of the M modulation symbols, computing a distance of the measured phase to each possible phase state of the second modulation symbol, and selecting a phase state having the shortest distance to the measured phase; upon determining phases of all M modulation symbols, the apparatus mapping phase transitions between the initial phase and the selected phases of the all M modulation symbols to N bits by using the mapping rules and outputting the N bits.

In an embodiment, the apparatus performs phase error correction by reducing a phase proportional to the distance between the measured phase of the first symbol and the selected phase state from a phase of the second symbol before measuring the phase of the second symbol;

In an embodiment, the apparatus estimates the phase error from the sequence of modulation symbols without a reference signal.

In an embodiment, the mapping rules allow a phase transition between consecutive modulation symbols to be either 0, $-\pi/2$, or $+\pi/2$.

In an embodiment, M=2 and N=3.

In an embodiment, the apparatus omits computation of distance to such phase states of the M modulation symbols that are not allowed by the mapping rules.

According to an aspect, there is provided a computer program product embodied on a computer-readable medium and comprising a computer program code readable by a computer, wherein the computer program code configures the computer to carry out a computer process comprising: storing a database for mapping rules for mapping a block of N bits into M modulation symbol phase transitions, wherein a phase transition between consecutive modulation symbols is limited to less than or equal to $\mp\pi/2$, wherein M is smaller than N, and wherein M is the smallest number required for realizing 2N different phase-transition combinations; receiving a multi-carrier symbol comprising a sequence of K modulation symbols and acquiring M modulation symbols from the sequence of K modulation symbols; determining an initial phase before a phase transition leading to the first symbol in the M modulation symbols; generating, by using the mapping rules, a trellis from the determined initial phase to the possible phase states of the M modulation symbols; measuring a phase of the first symbol of the M modulation symbols, computing a distance of the measured phase to each possible phase state of the first modulation symbol in the trellis, and selecting a phase state having the shortest distance to the measured phase; determining, on the basis of the mapping rules and the selected phase state, possible states of the second symbol of the M modulation symbols, measuring a phase of the second symbol of the M modulation symbols, computing a distance of the measured phase to each possible phase state of the second modulation symbol, and selecting a phase state having the shortest distance to the measured phase; upon determining phases of all M modulation symbols, mapping phase transitions between the initial phase and the selected phases of the all M modulation symbols to N bits by using the mapping rules and outputting the N bits.

According to an aspect, there is provided a computer program product embodied on a computer-readable medium and comprising a computer program code readable by a computer, wherein the computer program code configures the computer to carry out a computer process comprising: storing a database for mapping rules for mapping a block of N bits into M modulation symbol phase transitions, wherein a phase transition between consecutive modulation symbols is limited to less than or equal to $\mp\pi/2$, wherein M is smaller than N, and wherein M is the smallest number required for realizing 2N different phase-transition combinations; determining an initial phase; acquiring a block of N bits and modulating the block of N bits into M phase symbol transitions from the initial phase by using bit values of the block of N bits and the mapping rules, thus acquiring M modulation symbols; performing said determining, acquiring, and modulating for further blocks of N bits, thus acquiring a sequence of K modulation symbols; allocating the sequence of K modulation symbols to sub-carriers of a multi-carrier symbol and causing transmission of the multi-carrier symbol over a radio interface.

LIST OF DRAWINGS

Embodiments are described below, by way of example only, with reference to the accompanying drawings, in which FIG. 1 illustrates a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
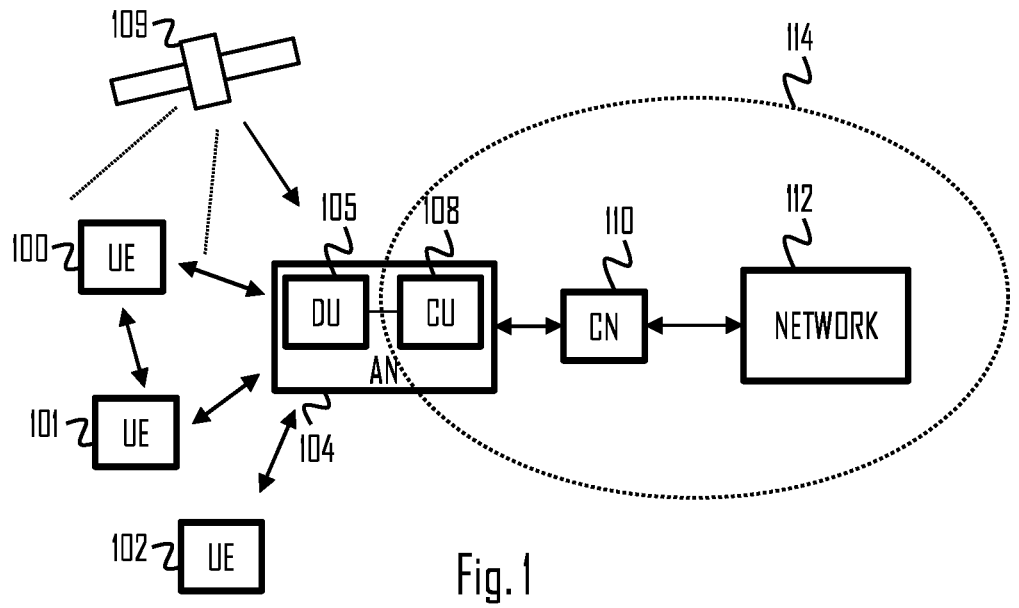

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100, 101, and 102 configured to be in a wireless connection on one or more communication channels in a cell with an access node AN (such as (e/g) NodeB) 104 providing the cell. (e/g) NodeB refers to an eNodeB or a gNodeB, as defined in 3GPP specifications. The physical link from a user device to a (e/g) NodeB is called uplink or reverse link and the physical link from the (e/g) NodeB to the user device is called downlink or forward link. It should be appreciated that (e/g) NodeBs or their functionalities may be implemented by using any node, host, server or access point etc. entity suitable for such a usage.

A communications system typically comprises more than one (e/g) NodeB in which case the (e/g) NodeBs may also be configured to communicate with one another over links, wired or wireless, designed for the purpose. These links may be used not only for signalling purposes but also for routing data from one (e/g) NodeB to another. The (e/g) NodeB is a computing device configured to control the radio resources of communication system it is coupled to. The NodeB may also be referred to as a base station, an access point, an access node, or any other type of interfacing device including a relay station capable of operating in a wireless environment. The (e/g) NodeB includes or is coupled to transceivers. From the transceivers of the (e/g) NodeB, a connection is provided to an antenna unit that establishes bi-directional radio links to user devices. The antenna unit may comprise a plurality of antennas or antenna elements. The (e/g) NodeB is further connected to a core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called user equipment UE, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. 5G specifications define two relay modes: out-of-band relay where same or different carriers may be defined for an access link and a backhaul link; and in-band relay where the same carrier frequency or radio resources are used for both access and backhaul links. In-band relay may be seen as a baseline relay scenario. A relay node is called an integrated access and backhaul (IAB) node. It has also inbuilt support for multiple relay hops. IAB operation assumes a so-called split architecture having CU and a number of DUs. An IAB node contains two separate functionalities: DU (Distributed Unit) part of the IAB node facilitates the gNB (access node) functionalities in a relay cell, i.e. it serves as the access link; and a mobile termination (MT) part of the IAB node that facilitates the backhaul connection. A Donor node (DU part) communicates with the MT part of the IAB node, and it has a wired connection to the CU which again has a connection to the core network. In the multihop scenario, MT part (a child IAB node) communicates with a DU part of the parent IAB node.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 105) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano) satellites are deployed). Each satellite in the mega-constellation may cover several satellite-enabled network entities 109 that create on-ground cells. The on-ground cells may be created through an on-ground relay node or by a gNB located on-ground or in a satellite 109.

It is obvious for a person skilled in the art that the depicted system is only an example of a part of a radio access system and in practice, the system may comprise a plurality of (e/g) NodeBs, the user device may have an access to a plurality of radio cells and the system may comprise also other apparatuses, such as physical layer relay nodes or other network elements, etc. At least one of the (e/g) NodeBs or may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

Figure 2:
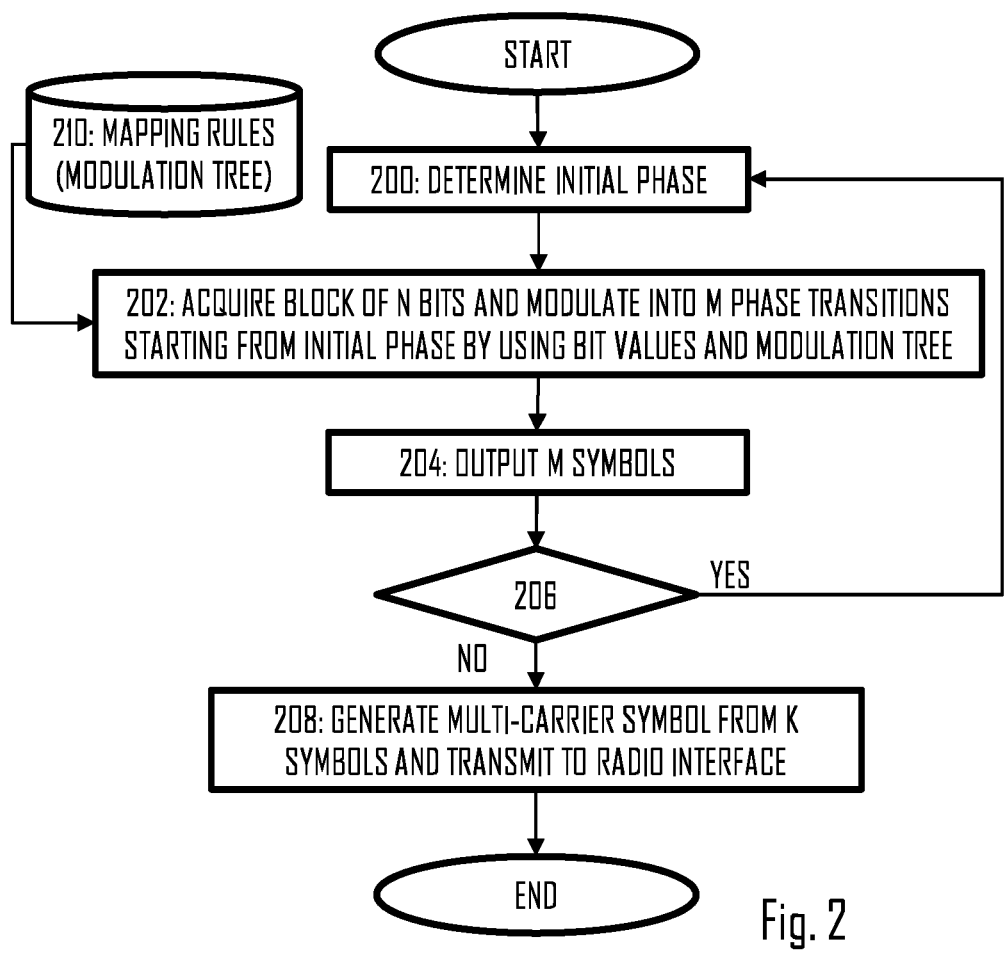
FIG. 2 illustrates a process for modulating bits to modulation symbols of a multi-carrier signal according to an embodiment.

As described in Background, design of signal models that reduce the PAPR would be advantageous. FIG. 2 illustrates a flow diagram of a procedure for generating a signal with low PAPR for transmission over a radio interface, e.g. from a terminal device 100 to 102 to an access node 104 or between two terminal devices or peer devices in a wireless network. The wireless network may be the cellular communication system or it may be another type of wireless network, such as a mesh network, a local area network, or a personal area network. Referring to FIG. 2, the process comprises in a transmitter apparatus: storing a database (210) for mapping rules for mapping a block of N bits into M modulation symbol phase transitions, wherein a phase transition between consecutive symbols is limited to less than or equal to $\mp\pi/2$, wherein M is smaller than N, and wherein M is the smallest number required for realizing 2N different phase-transition combinations; determining an initial phase (block 200); acquiring (block 202) a block of N bits and modulating the block of N bits into M phase symbol transitions from the initial phase by using bit values of the block of N bits and the mapping rules, thus acquiring M modulation symbols (output in block 204); performing (YES in block 206) said determining, acquiring, and modulating for further blocks of N bits, thus acquiring a sequence of K modulation symbols; and allocating the sequence of K modulation symbols to sub-carriers of a multi-carrier symbol and causing transmission of the multi-carrier symbol over a radio interface (block 208).

Let us briefly describe the meaning of the initial phase. If the block of N bits currently being processed in block 202 is not the first block in the sequence of K modulation symbols, the initial phase is a phase of the last symbol in a preceding block of N bits in the sequence of K modulation symbols. If the block of N bits is the first block for the sequence of K modulation symbols, the initial phase may be either a constant default phase (see phase alignment in the process of FIG. 7), or it may be the ending phase of the (directly) preceding block of K modulation symbols.

It should be appreciated that the waveforms mentioned in Background fall within the scope of the description of FIG. 2. The multi-carrier symbol may be a true multi-carrier symbol such as the OFDM but it also encompasses the virtual multi-carrier schemes such as the SC-FDMA and the DFT-S-OFDM where a multi-carrier signal is transformed into a time-domain single-carrier waveform via inverse Fourier transform.

For the sake of completeness, the phase transition between consecutive symbols being limited to less than or equal to $\mp\pi/2$ means that the phase transition between consecutive modulation symbols is either clockwise and at most $\pi/2$ or anti-clockwise and at most $\pi/2$. The attribute T thus indicates the two options of the direction of the phase transition.

The process of FIG. 2 thus generates a telecommunication signal comprising a multi-carrier symbol carrying the sequence of K modulation symbols. The modulation symbols are generated according to the mapping rules for mapping a block of N bits into M modulation symbol phase transitions. The phase transition between consecutive modulation symbols is limited to less than or equal to $\mp\pi/2$ which limits the phase rotation in the sequence of modulation symbols, thus allowing the reduction of the PAPR, as described in greater detail below. And as described in FIG. 2, the sequence of K modulation symbols comprises c*M modulation symbols where c is an integer greater than one. The number of modulation symbols is determined on the basis of the sub-carriers in the multi-carrier signal selected to carry the modulation symbols (active sub-carriers), and the number of modulation symbols K may be smaller than or equal to the number of sub-carriers. The number of active-sub-carriers may be smaller than or equal to a total number of available sub-carriers in the multi-carrier signal. K may be smaller than the number of sub-carriers, for example, when some of the sub-carriers are dedicated to signal waveform shaping according to tone reservation principles, for example. There may be other mechanisms where some of the sub-carriers are dedicated to other purposes than for transmitting data or signalling information.

The block of N bits may comprise data bits or signalling information bits.

In an embodiment, a phase transition between consecutive symbols is either 0, $-\pi/2$, or $+\pi/2$. The other phase transitions may be prevented. Such a scheme may be called 3-ary minimum phase shift keying (3MSK). '3' comes from that only three phase transition options are possible, and the MSK spans from that transitions to only the 'neighbouring' symbols along the unit circle are possible.

Figure 3:
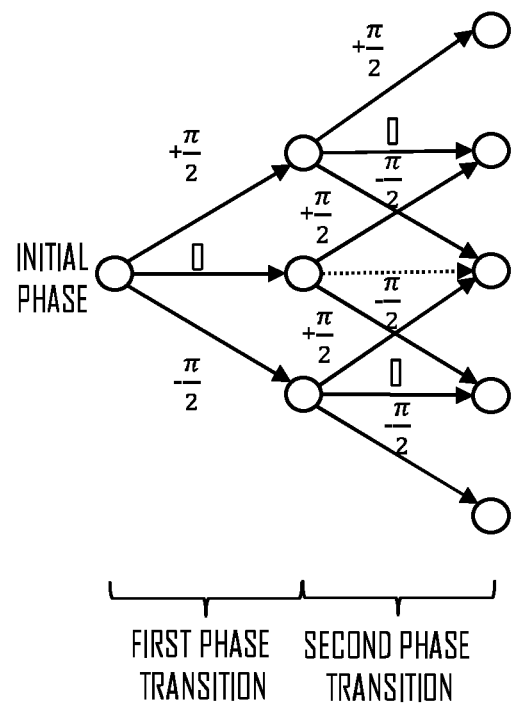
FIG. 3 illustrates a mapping rule for modulation according to an embodiment.

FIG. 3 illustrates an embodiment of the mapping rules when N=3 and M=2. Accordingly, each symbol carries practically 1.5 bits. This means that spectral efficiency is greater than that of binary phase shift keying modulation (one bit per symbol) but less than that of the QPSK (two bits per symbol). As illustrated in FIG. 3, two phase transitions are needed to realize nine different paths in the trellis, thus complying with the requirement for being the smallest number required for realizing $2^3$=8 different phase-transition combinations. In fact, one path may even be disabled by the mapping rules. Table 1 below illustrates an embodiment of the mapping rules mapping three bits into two consecutive phase transitions.

TABLE 1

| Bit 1 | Bit 2 | Bit 3 | Transition 1 | Transition 2 |
|---|---|---|---|---|
| 0 | 0 | 0 | $-\pi/2$ | $+\pi/2$ |
| 0 | 0 | 1 | $+\pi/2$ | $-\pi/2$ |
| 0 | 1 | 0 | $-\pi/2$ | 0 |
| 0 | 1 | 1 | 0 | $-\pi/2$ |
| 1 | 0 | 0 | 0 | $+\pi/2$ |
| 1 | 0 | 1 | $+\pi/2$ | 0 |
| 1 | 1 | 0 | $-\pi/2$ | $-\pi/2$ |
| 1 | 1 | 1 | $+\pi/2$ | $+\pi/2$ |

As illustrated in Table 1 and in FIG. 3 by the dashed arrow, the mapping rules prevent two consecutive zero-phase transitions. This realizes the symmetric trellis of FIG. 3 where positive phase rotation provides a branch upwards in the trellis, a negative phase rotation provides a branch downwards in the trellis, and no phase rotation provides a horizontal branch in the trellis. However, any other path at the second phase transition stage could be blocked, depending on the implementation. In fact, it has been discovered that an asymmetric trellis provides slightly better spectral characteristics of the multi-carrier symbol in terms of lower out-of-band emissions. From that perspective, it could be more preferable to block either $+\pi/2$ or $-\pi/2$ transition in the second phase, when the first transition is the zero-phase transition.

Table 1 provides an example of the mapping rules that provide a suitable (Hamming and Euclidean) distance for facilitating demodulation and detection. However, other solutions that provide equal performance can be designed so the mapping rules of Table 1 are by no mean exhaustive or limiting.

The principle can be expanded to other values of M and N in a straightforward manner. Another example of possible values for M and N would be M=4 and N=4 where each modulation symbol would carry 1 bit. Since the spectral efficiency degrades with the larger blocks of bits, M=2, N=3 may be considered to be a preferred solution. However, substantially similar low-PAPR signal model can be reached with the other values of M and N.

Figure 4:
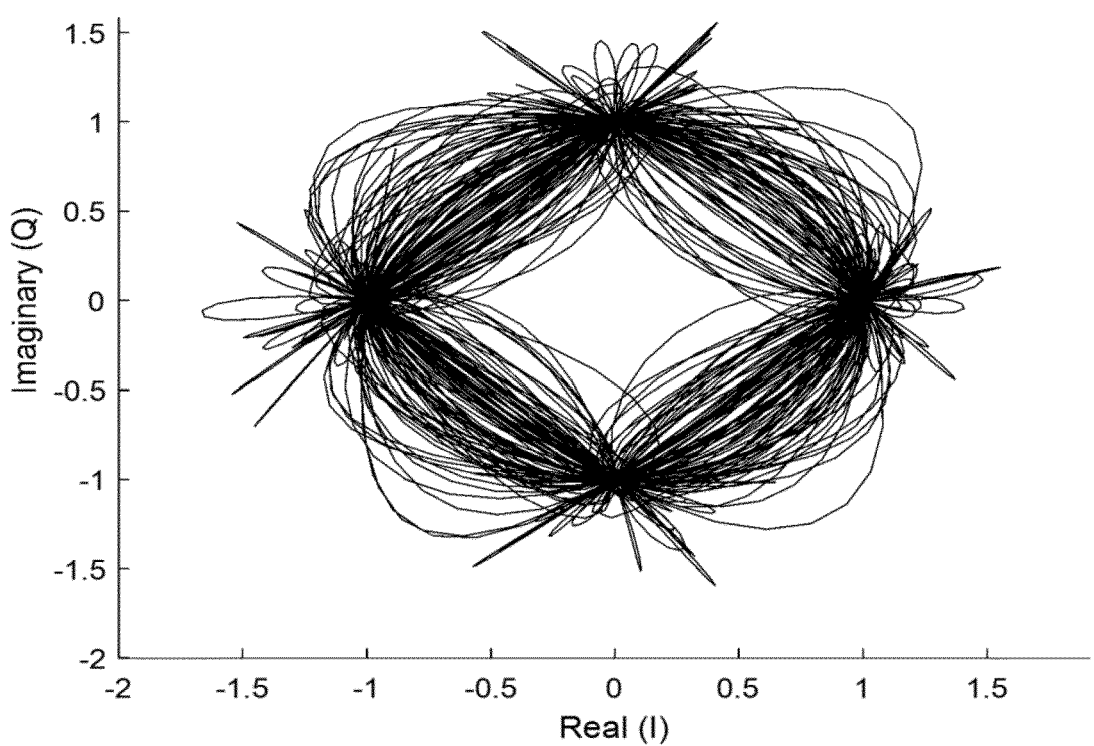
FIG. 4 illustrates an IQ scatterplot resulting from modulation according to an embodiment.

Limiting the phase transition between the consecutive symbols to ∓π/2 at most effectively prevents zero crossings between the consecutive symbols in an IQ diagram (unit circle) illustrated in FIG. 4. FIG. 4 illustrates an IQ scatterplot of an example of the sequence of K modulation symbols when the phase transition between the consecutive symbols is either 0, −π/2, or +π/2. This effectively realizes a symbol constellation that is similar to the symbol constellation of the QPSK modulation scheme, but the difference is that the QPSK does not limit the phase transitions between the consecutive symbols. With the limitation of the phase transition, the phase rotates along the unit circle without zero crossings. This characteristic provides the effect of reduced PAPR. Another characteristic of the signal model resulting from the modulation described and reducing the PAPR is a constant-envelope property.

Figure 5:
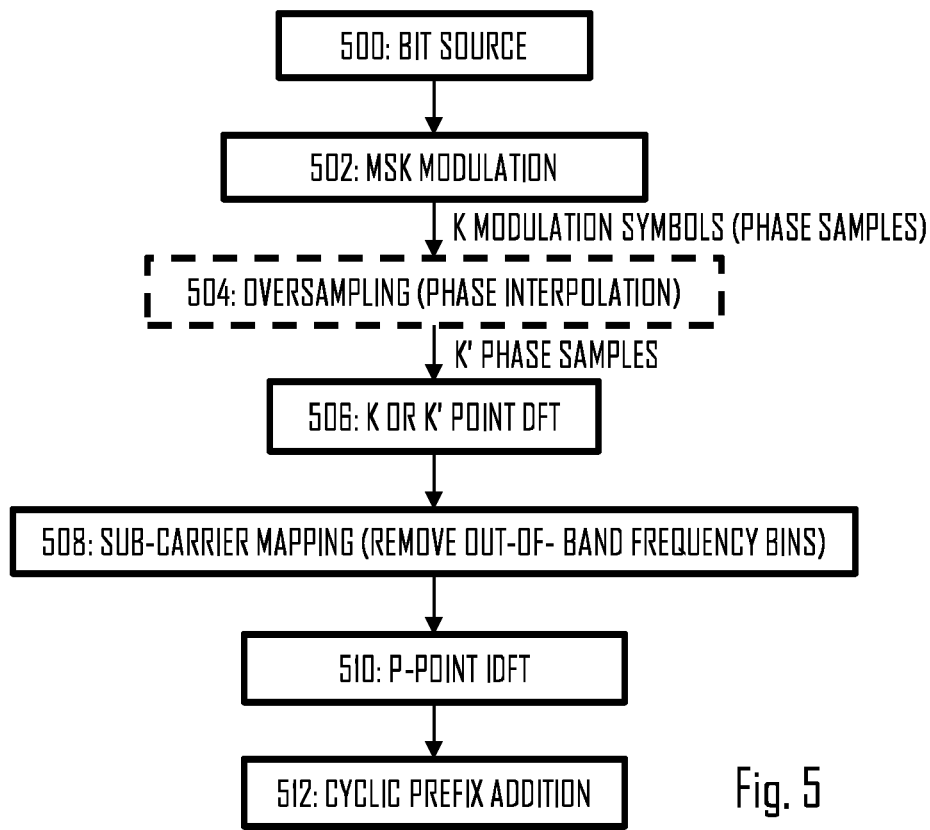
FIG. 5 illustrates functions of a transmitter chain according to an embodiment.

In an embodiment, the multi-carrier signal is a discrete Fourier transform spread orthogonal frequency-division multiplexing, DFT-S-OFDM signal. The DFT-S-OFDM signal and its generation is as such known to the person skilled in the art from, for example, the 3GPP specifications for 5G. FIG. 5 illustrates the generation of such a multi-carrier signal on a summary level, including the above-described modulation method based on the mapping rules. Referring to FIG. 5, bits to be modulated are generated in block 500 by a bit source. The bit source may be an application processor generating application payload data to be transmitted, or it may be a radio modem generating signalling bits required to manage a radio connection between the transmitter apparatus and a receiver apparatus, e.g. for the delivery of the data bits. In block 502, the modulation according to the process of FIG. 2 or any one of the embodiments described herein is performed, thus providing the sequence of K modulation symbols in the form of samples carrying the information on bits in the phase transitions of the modulation symbols. The phase transitions may occur linearly or otherwise 'smoothly' during a symbol period and between sampling time instants.

In block 506, the sequence of K modulation symbols is transformed into a frequency domain via a K-point discrete Fourier transform (DFT), and the transformed block of modulation symbols is then mapped to sub-carriers according to the DFT-S-OFDM or SC-FDMA block allocation principle in block 508. Accordingly, the sequence of K modulation symbols become allocated to the sub-carriers after the DFT. Thereafter, the resulting signal is transformed back to a time domain via an inverse DFT in block 510, thus providing the multi-carrier symbol. Then, a cyclic prefix is added to the head of the multi-carrier symbol in block 512. As known in the art, a determined number of tail samples of the multi-carrier symbol may be copied to the head of the multi-carrier symbol to realize the cyclic prefix. Thereafter, the multicarrier symbol with the cyclic prefix may proceed to further transmission procedures in the transmitter apparatus, including power-amplification in a power amplifier. As described above, the multi-carrier symbol may be a true multi-carrier symbol such as the OFDM or a virtual multi-carrier symbol having the single-carrier waveform according to the SC-FDMA or DFT-S-OFDM.

In an embodiment, the sequence of K modulation symbols is oversampled by interpolating phase samples between the modulation symbols. The oversampling (if implemented) would be performed in block 504, thus producing K' phase samples where K'=o*K where o is an oversampling factor representing the number of additional samples per modulation symbol. In an embodiment, the oversampling factor o is two which has been discovered to provide high performance in terms of out-of-band emissions that are discussed below.

The interpolation may be carried out by applying an interpolation filter to the sequence of K modulation symbols. The interpolation filter may have the following impulse response h, for example:

$$h = [-a, 0, 0.5 + a, 1, 0.5 + a, 0, -a]$$

where a can be selected according to the desired properties to make the interpolation filter preferably linear. In an embodiment, a=0. With the impulse response above, the original phases of the sequence of K modulation symbols are not affected. In an embodiment, the value of a is within a range [0, 0.2]. Interpolation with such a filter has been found to improve bit error rate performance with a marginal effect on the PAPR and the spectrum characteristics.

When the interpolation is implemented in the process of FIG. 5, the DFT is obviously a K'-point DFT. Now that there are a higher number of frequency samples (bins), block 508 may comprise eliminating (e.g. setting to zero or not mapped to the inverse DFT) frequency samples that are outside a passband of the multi-carrier symbol. The passband may be understood to comprise a band where the K sub-carriers carrying the information are comprised and, if present, one or more excess bands that are used for signal shaping, for example. In another embodiment, also the frequency samples on the excess band(s) are eliminated. In case of using transition bands between frequency blocks, frequency samples on the transition bands may be eliminated or maintained as filtered by a raised-cosine function, for example. Then, the inverse DFT is performed on the remaining frequency samples.

In another embodiment, the interpolation is conducted in the frequency domain. In such a case, the DFT may be a K-point DFT and additional frequency bins are interpolated between the K frequency bins.

Figure 6:
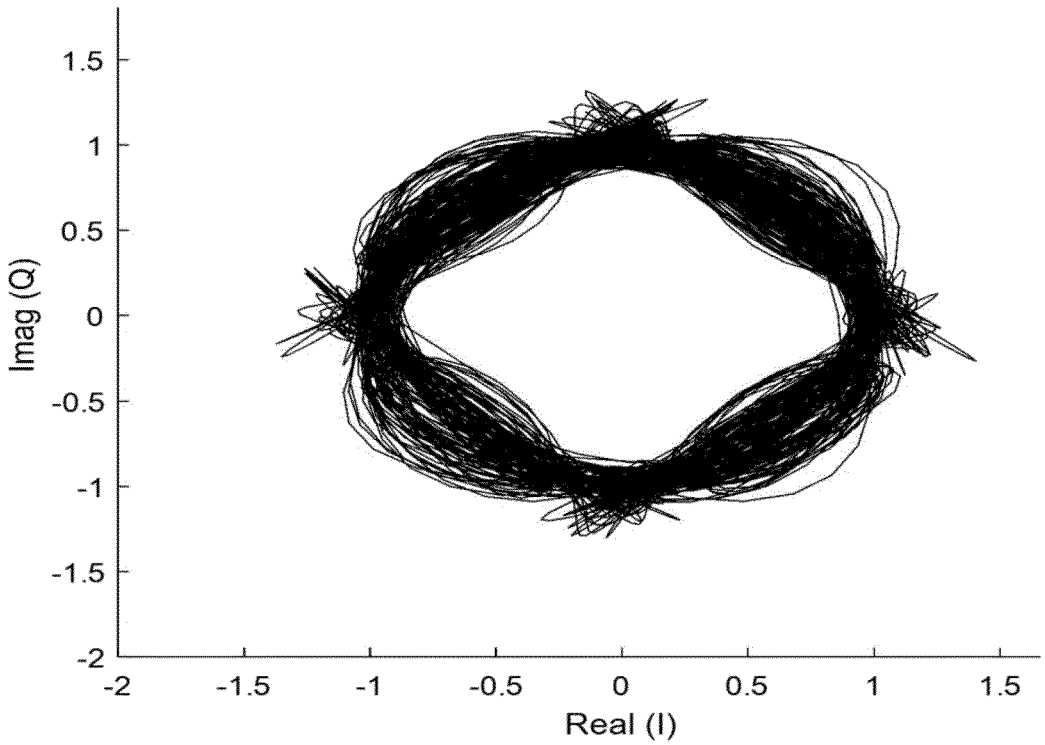
FIG. 6 illustrates an IQ scatterplot resulting from further embodiments.

The use of oversampling smooths the frequency spectrum of the multi-carrier symbol, reducing out-of-band emissions. The oversampling also provides a smoother IQ scatterplot than that of FIG. 4, thus demonstrating improvement in the PAPR as well. FIG. 6 illustrates an IQ scatterplot when the oversampling is used. Additionally, phase alignments described below are enabled in the IQ scatterplot of FIG. 6.

Figure 7:
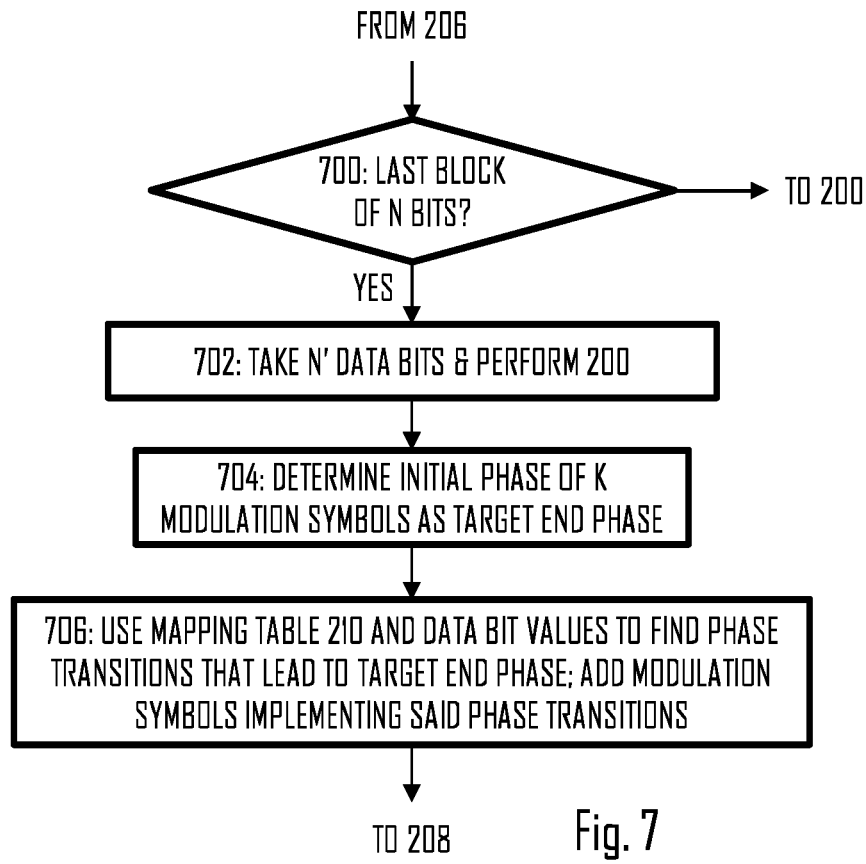
FIG. 7 illustrates a process for oversampling transmitted phase samples according to an embodiment.

In an embodiment, the sequence of K modulation symbols is arranged to start and end at the same phase q. In particular, an end phase of the last modulation symbol in the sequence of K modulation symbol and the initial phase of the first modulation symbol in the sequence of K modulation symbols are equal. FIG. 7 illustrates a procedure for realizing this property. In summary, the last block of bits has only N' bits where N' is greater than zero (may be one bit) but less than N. Then, the value(s) of the N' bits and the target phase φ is used to determine the phase transitions required to both convey information on the N' bit value(s) and to end the K modulation symbols at phase q. A technical effect of this property is phase-continuity between the end of the cyclic prefix and the beginning of the sequence of K modulation symbols. The phase continuity further reduces the PAPR, as described above.

Referring to FIG. 7, the process described below may follow block 206 of FIG. 2. Upon modulation a sufficient number of blocks of N bits to reach almost the number of K modulation symbols, the last modulation symbols for the sequence of K modulation symbols may be determined by using the process of FIG. 7. Accordingly, block 700 may comprise determining whether the next modulation symbols will be the last modulation symbols in the sequence of K modulation symbols. K may be a fixed parameter or otherwise preset and known beforehand. As described above, it may be proportional to the number of sub-carriers allocated to the transmitter apparatus for transmission of the multi-carrier signal. Accordingly, block 700 may comprise determining whether or not the number of modulation symbols in the sequence so far comprises K−2 modulation symbols. K−2 may be replaced by another value depending on the applied MSK modulation scheme. For example, if the symbol constellation follows the 8-PSK constellation, K−2 may be replaced by K−4. If not, the process returns to block 200 to process the next block of N bits. Otherwise, the process proceeds to block 702 where N' data bits are taken as input, and the initial phase is determined in the above-described manner from the ending phase of the preceding modulation symbol. In block 704, the target phase φ where the last modulation symbol of the sequence shall end is determined. As described above, it may be the same as the initial phase φ of the sequence of K modulation symbols before the first modulation symbol of the sequence. The mapping rules 210 may define the modulation symbols needed to generate to both modulate the N' bits and to end at the target phase φ, using the bit value(s) of N' bit(s) and the initial phase determined in block 702. Table 2 below illustrates an example of such a mapping table. In the mapping table of Table 2, N'=1, N=3, and M=2. Accordingly, two modulation symbols are generated on the basis of one data bit.

TABLE 2

| Initial Phase after Previous Modulation Symbol | Last Bit | First Transition | Second Transition |
|---|---|---|---|
| 0 | 0 | −π/2 | +π/2 |
| 0 | 1 | +π/2 | −π/2 |
| +π/2 | 0 | −π/2 | 0 |
| +π/2 | 1 | 0 | −π/2 |
| −π/2 | 0 | 0 | +π/2 |
| −π/2 | 1 | +π/2 | 0 |
| π | 0 | −π/2 | −π/2 |
| π | 1 | +π/2 | +π/2 |

Equal initial and end states for the sequence of K modulation symbols are advantageous also from the perspective of the receiver because the receiver is then able to determine the initial phase from the sequence of K modulation symbols without needing the additional symbol to deliver the initial phase. In case of the DFT-S-OFDM signal, the receiver's Fourier transform process may be of length K and, thus, not capable of delivering the additional symbol without modification. In other words, the initial phase for the first transition needs not to be signalled because it can be determined from the ending phase of the last symbol in the sequence of K modulation symbols. Block 706 then uses the mapping table comprised in the mapping rules 210 to force the end phase of the sequence to the same phase φ as the initial phase for the sequence.

Figure 8:
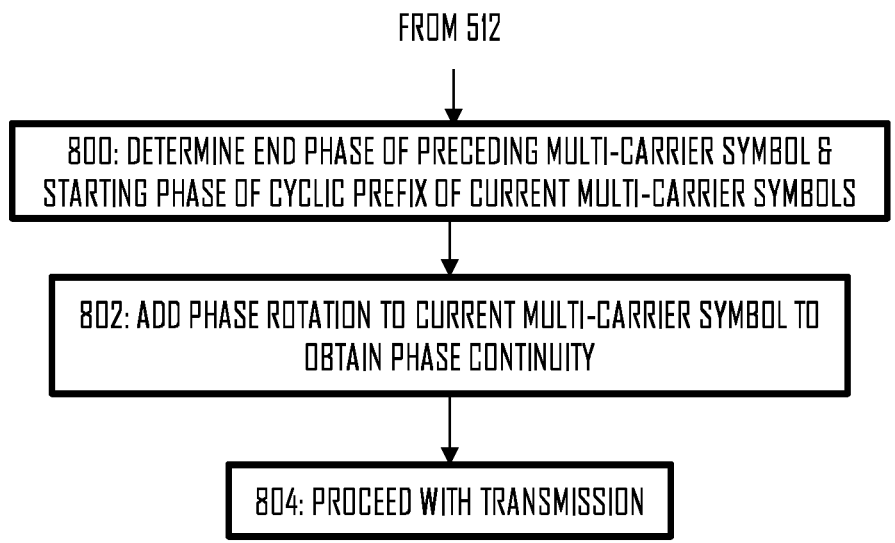
FIG. 8 illustrates an embodiment for realizing phase continuity in a transmitted signal.

As obvious from the description above, the transmitter apparatus may generate a sequence of multi-carrier symbols, each multi-carrier symbol carrying a sequence of K modulation symbols generated according to the principles described above. It has been discovered that phase continuity between the consecutive multi-carrier symbols further reduces the PAPR and reduces the out-of-band emissions. Let us assume the cyclic prefix between the consecutive multi-carrier symbols, which means that the phase continuity is defined in this embodiment to be between the end of a first multi-carrier symbol and the start of the cyclic prefix of the subsequent second multi-carrier symbol. FIG. 8 illustrates a flow diagram of a process for reaching the phase continuity. The process may be entered after generating the cyclic prefix in block 512. Referring to FIG. 8, the process comprises determining (block 800) a phase at the end of the first multi-carrier symbol, e.g. a multi-carrier symbol before the second multi-carrier symbol generated currently in the process of FIG. 5. Then, block 802 comprises performing phase rotation of the second multi-carrier symbol so that the cyclic prefix will start with the phase determined in block 800.

Figure 9:
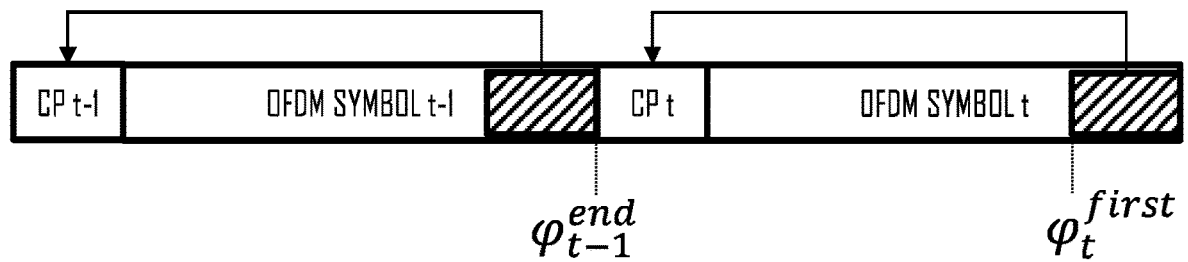
FIG. 9 illustrates consecutive multi-carrier symbols with respective cyclic prefixes.

FIG. 9 illustrates the first multi-carrier symbol (index t−1) and the second multi-carrier symbol (index t) with respective cyclic prefixes. Referring to FIG. 9, the needed phase rotation may be defined as $\phi_{t-1}^{end} - \phi_t^{first}$, where $\phi_t^{first}$ is the phase of the first sample of the cyclic prefix t and $\phi_{t-1}^{end}$ is the end phase of the previous first multi-carrier symbol t−1. The multi-carrier symbol t may thus be phase-rotated accordingly to acquire the phase continuity. By using both processes of FIGS. 7 and 8, full phase continuity may thus be acquired at all boundaries of the multi-carrier symbols, i.e. between the end of a multi-carrier symbol and the start of the subsequent cyclic prefix and between the end of the cyclic prefix and the start of the multi-carrier symbol of the cyclic prefix. However, in other embodiments some phase shift may be allowed at either or both of these boundaries. Advantageous properties can be achieved when the phase shift is lower than or equal to π/2. Even when the phase shift is ∓π/2, the resulting signal follows the patterns illustrated in FIGS. 4 and 6, thus achieving the desired properties. The appropriate amount of phase shift may be selected according to the system design. And by using the oversampling and the phase continuity according to the above-described principles, the IQ scatterplot of FIG. 6 with very low PAPR can be achieved.

Let us then describe a receiver for demodulating the sequence of K modulation symbols. A front-end of the receiver may comprise conventional analogue and digital circuits and, analogously to the functions of FIG. 5, a received multi-carrier symbol may undergo the following processing before the demodulation. First, the cyclic prefix may be removed, followed by the discrete Fourier transform. Thereafter, frequency-domain equalization may be performed to remove the effect of radio channel induced on the received multi-carrier symbol. Thereafter, an inverse-DFT may be performed, thereby producing the sequence of K modulation symbols corrupted by noise induced in the radio channel and potentially in the transmitter and receiver circuits.

Figure 10:
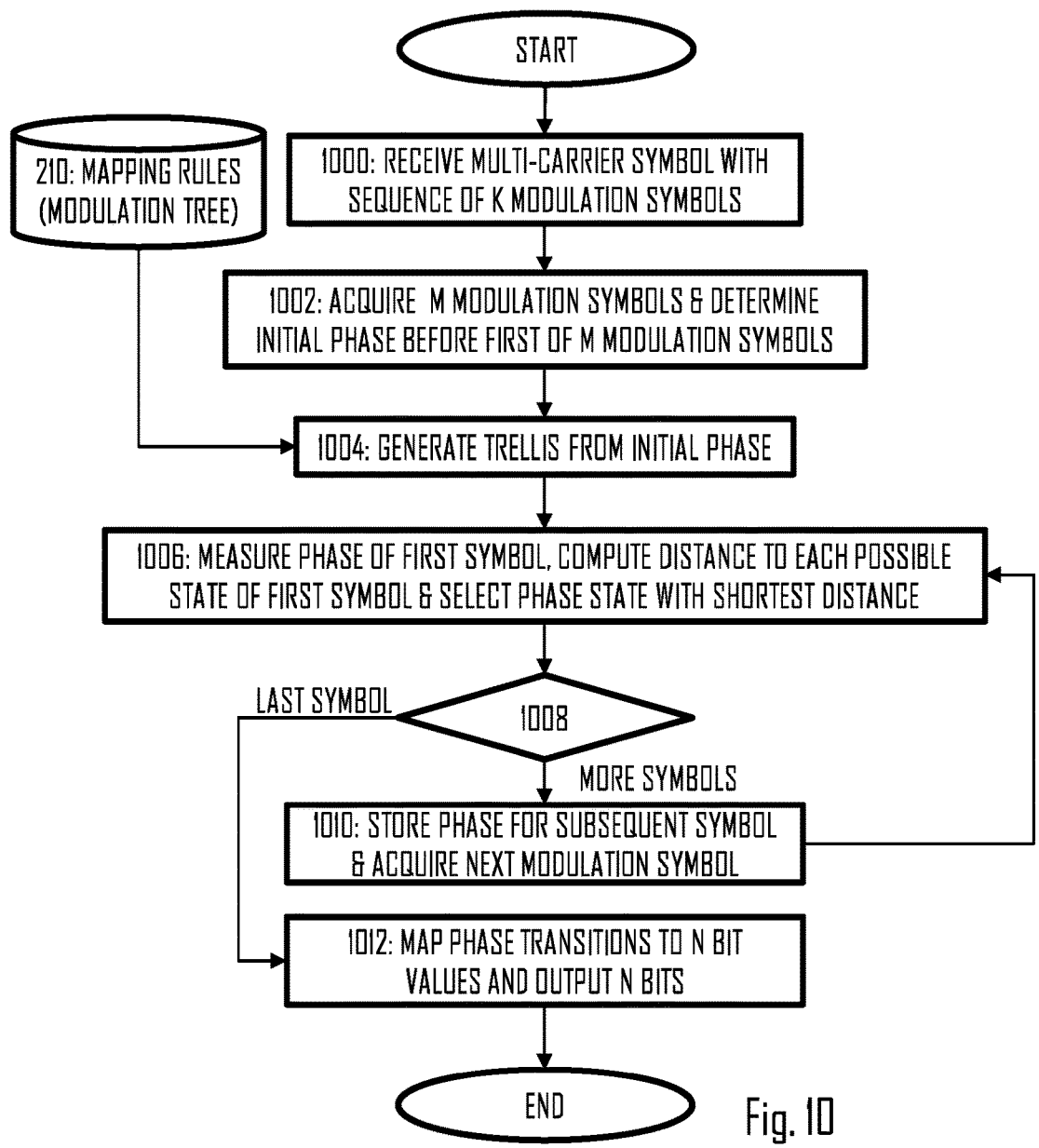
FIG. 10 illustrates a process for demodulating a sequence of modulation symbols according to an embodiment.

As described above, since the information on the bits is delivered by the phase transitions instead of the absolute phases of the modulation symbols, a non-coherent receiver may be used, thus providing lower complexity in the receiver because no reference signal processing is required to achieve the phase coherence with the transmitter. FIG. 10 illustrates a flow diagram for demodulating the sequence of K modulation symbols in an apparatus for the receiver. The receiver may store the same mapping rule database 210 as the transmitter. The mapping rules may store the modulation trellis of FIG. 3, for example, if the transmitter uses the modulation tree and the mapping rules of Table 1. Upon receiving a multi-carrier symbol comprising a sequence of K modulation symbols in block 1000, M modulation symbols may be acquired from the sequence of K modulation symbols in block 1002. Similarly, an initial phase for the M modulation symbols may be determined. The initial phase may be an ending phase of a preceding block of M modulation symbols or, if the block is the first block and the phase-alignment of FIG. 7 is used, the end phase of the last modulation symbol in the sequence of K modulation symbols. In yet another embodiment, the first modulation symbol in the sequence of modulation symbols may be dedicated for providing the initial phase for the first transition from the initial phase to the phase of the first modulation symbol of the sequence.

Figure 11:
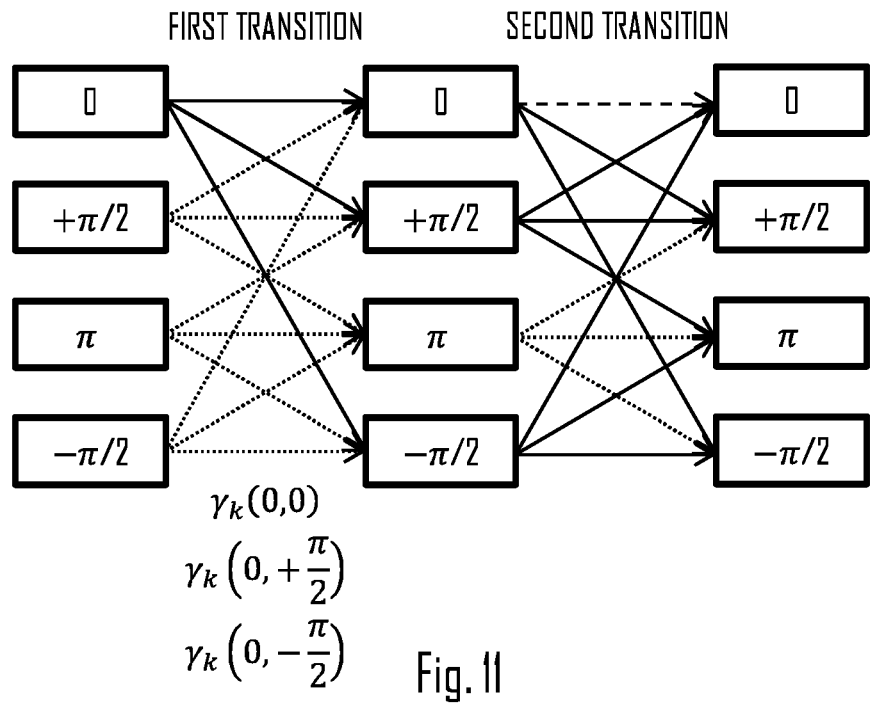
FIG. 11 illustrates a trellis diagram for a receiver according to an embodiment.

In block 1004, a trellis from the initial phase is generated, the trellis defining the N phase transitions according to the mapping rules. If the transmitter uses the mapping rules of FIG. 3, the trellis may have a corresponding tree structure. FIG. 11 illustrates the mapping rules of the tree of FIG. 3 from each of the four possible initial phases 0, $\pi/2$, $\pi$, $-\pi/2$. In the case of the initial phase for the first phase transition of the sequence, the initial phase may be arbitrary because of the non-coherence property. In the embodiment of FIG. 11, the tree is now build by determining that the initial phase is '0' and, as a consequence, the branches not possible according to the mapping rules are disabled (indicated by dotted arrows), while the possible branches are enabled (solid arrows). Since two consecutive zero-phase transitions is blocked in the mapping rules of FIG. 3, it is disabled also in the generated trellis (dashed arrow).

In block 1006, a phase of the first symbol of the M modulation symbols is measured, a distance of the measured phase to each possible phase state of the first modulation symbol in the trellis is computed, and a phase state having the shortest distance to the measured phase is selected for the first modulation symbol. In other words, the most likely phase for the first modulation symbols becomes selected. The distance may be a Euclidean distance or an angular distance, for example. Thereafter, it is determined in block 1008 whether or not the currently processed symbol is the last symbol of the M modulation symbols. If not, the selected phase or the measured phase is stored in block 1010 as the initial phase for the subsequent modulation symbol, the subsequent modulation symbol of the M modulation symbols is acquired and the process returns to block 1006. Accordingly, possible states of the subsequent (second) symbol of the M modulation symbols are determined on the basis of the mapping rules and the stored phase state, a phase of the subsequent (second) symbol of the M modulation symbols is measured, a distance of the measured phase to each possible phase state of the second modulation symbol is computed, and a phase state having the shortest distance to the measured phase is selected, similarly to the first modulation symbol. Upon determining phases of all M modulation symbols, the process proceeds from block 1008 to block 1012 where phase transitions between the initial phase and the selected phases of the M modulation symbols are mapped to N bits by using the mapping rules, and the N bits with corresponding bit values are output for further processing.

In an embodiment, the phase stored in block 1010 is stored also in block 1012 for the next block of M modulation symbols of the sequence of K modulation symbols, unless the processed M modulation symbols are the last modulation symbols of the sequence.

In an embodiment, the receiver structure follows the principles of a maximum likelihood receiver such as a Viterbi receiver known in the art. In another embodiment, the receiver structure follows principles of a maximum a posteriori receiver such as a Bahl-Cocke-Jelinek-Raviv (BCJR) algorithm also known in the literature.

Figure 12:
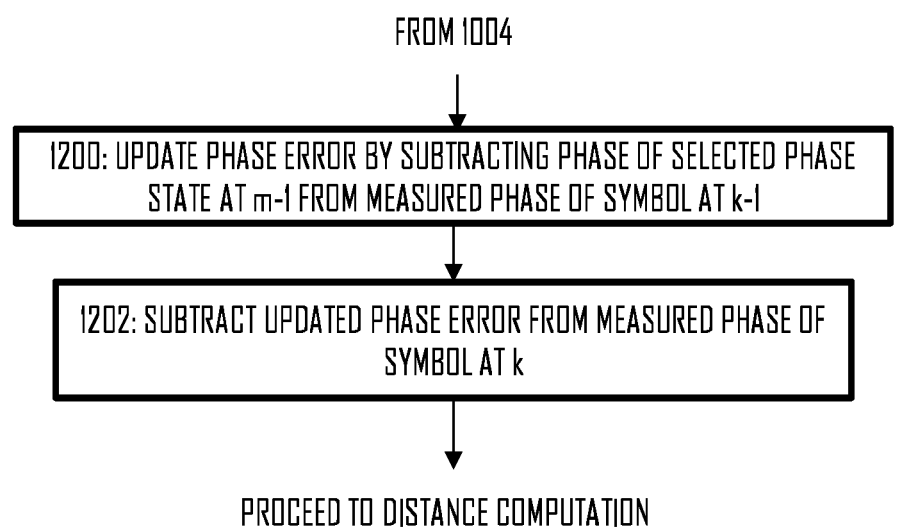
FIG. 12 illustrates a process for phase error tracking and correction according to an embodiment.

In an embodiment, phase error correction is added to the receiver processing to remove the effects of phase noise. FIG. 12 illustrates such an embodiment where the process of FIG. 12 may be entered from block 1004. Referring to FIG. 12, the phase error correction is performed by first determining (block 1200) the phase error by subtracting a phase of the phase of the selected phase state of the current modulation symbol from the measured phase of the current modulation symbol. This residual is considered then as the phase noise that corrupted the transmitted modulation symbol and caused the distance between the selected and measured phase. Then, the phase error is reduced from the measured phase of the subsequent modulation symbol in block 1202 before the distance computation. The Equation below incorporates an averaging function to control the phase error estimation and suppression. The averaging smooths errors in the phase noise estimation and, on the other hand, makes the suppression slower to respond to very quick changes in the phase error. A suitable length of the averaging for each implementation can be designed by the person skilled in the art. No reference signal is required for estimating the phase error because the phase error is estimated from the sequence of modulation symbols.

As described above, the non-coherent receiver may be used, with the addition of phase error tracking that updates the phase error estimate recursively for each surviving path during the trellis search. The phase error is tracked by only using the modulation symbols carrying the data. For each surviving path corresponding to the selected phase state in block 1006, the recursive phase error estimate may be updated as:

$$\Delta_k^n = (1-\lambda)\cdot\Delta_{k-1}^m + \lambda(\phi_{observed} - \phi_{3MSK}^n),$$

$$m \in \{1, 2, \ldots, N_{states}\},$$

$$n = 1, 2, \ldots, N_{states}$$

where m is the previous state (symbol k−1) in the surviving path to state n on the kth symbol (i.e., the path with the lowest distance among all the paths arriving to the state n at time instant k), $N_{states}$ is the number of phase states, $\phi_{observed}$ is the measured phase of $k^{th}$ modulation symbol and $\phi_{3MSK}^n$ is the phase state of the modulation symbol of state n. The constant $\lambda$ is an estimation step parameter that controls the recursive update of the phase error, in practice how much weight is assigned to the current phase error measurement and how much to the earlier phase error measurements. A suitable value for the estimation step parameter can be found via experimentation.

Let us now return to the trellis diagram of the receiver with $N_{states}=4$ illustrated in FIG. 11. Each state may represent a complex-valued modulation symbol of the underlying symbol constellation that is similar to the QPSK constellation. With the initial phase for the first symbol known, there are only three possible phases of the first modulation symbol then, following the mapping rule of FIG. 3 and Table 1. After processing the first modulation symbol, there are 3 possible transitions from each possible phase state of the first modulation symbol (based on transitions 0 and $\pm\pi/2$), with two consecutive zero-phase transitions blocked. As illustrated in FIG. 3, the trellis diagram continues until the end of the block of M modulation symbols. $\alpha_k(n)$ is used to represent the probability of a phase state n at the time instant k. The phase state value based on the distance computation follows the expression $$\alpha_k(n) = \min\{\alpha_{k-1}(m)\cdot\gamma_k(m,n)\}, n=1,2,\ldots,N_{states}$$

where $\gamma_k(m,n)$ is the transition metric, that can be based for example on Euclidean or angular distance between the received symbol (corrected by a conjugate of the phase error estimate, if the phase correction is implemented), and can be represented for a phase state m as follows:

$$\gamma_k(m, n) = dist\{r_k \cdot \exp(-j\Delta_{k-1}^m), \exp(j\phi_{3MSK}^n)\}$$

where dist{·} represents the above-described distance, exp $(-j\Delta_{k-1}^m)$ is the phase error correction factor from state m in the instant k−1 (the last update of phase error estimate), $r_k$ is the received modulation symbol at instant k, and $\phi_{3MSK}^n$ is the phase state of the modulation symbol of state n.

In an embodiment, computation of the distance to phase states of the M modulation symbols that are not allowed by the mapping rules is omitted, thus reducing the computational complexity.

Figure 13:
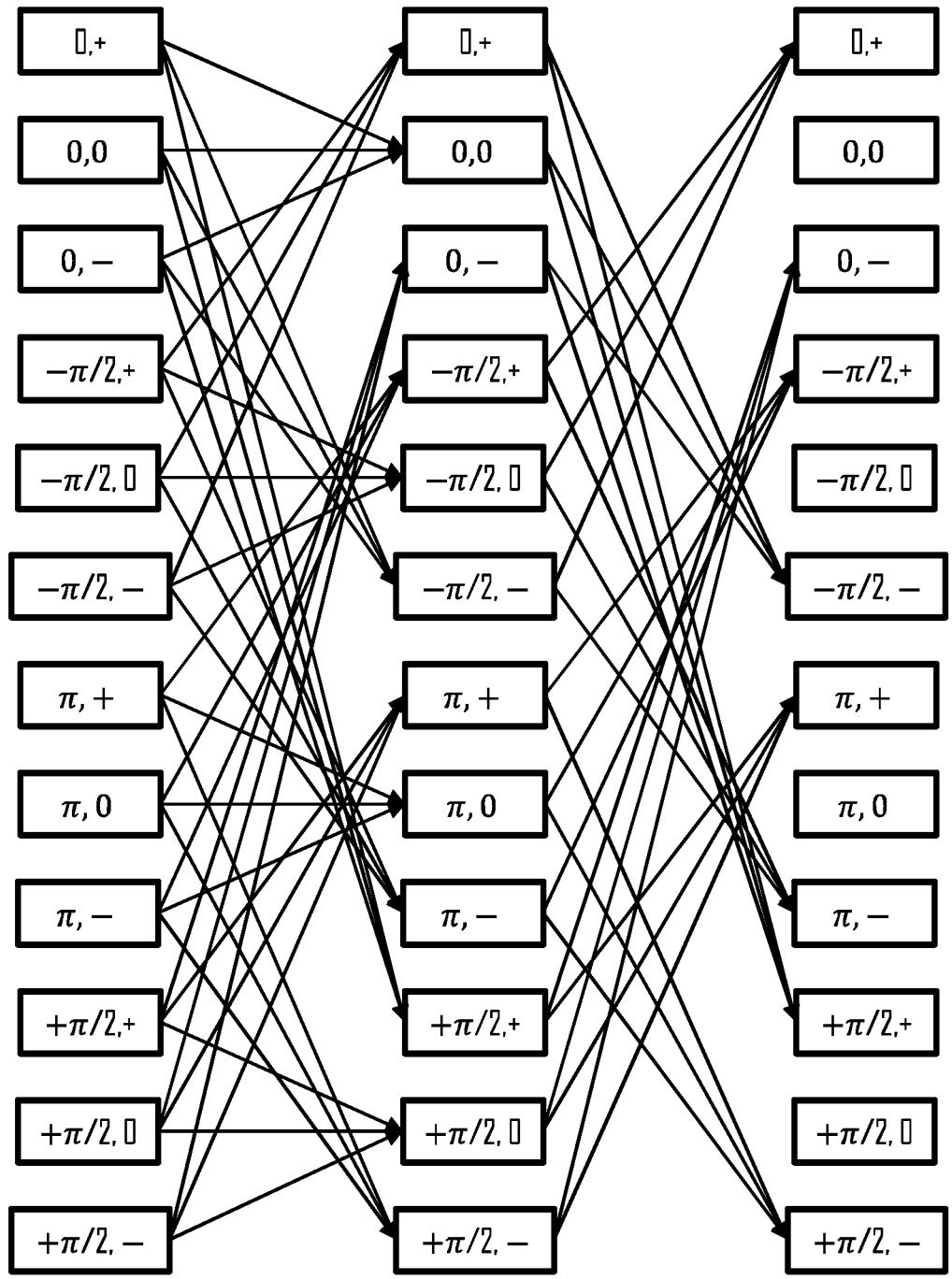
FIG. 13 illustrates another trellis diagram for a receiver according to an embodiment.

In another embodiment, a more complex trellis is employed, and such a trellis is illustrated in FIG. 13. In this trellis, not only the initial phase but also the phase transition to the initial phase is taken into account. Such a trellis may be used for the modulation symbols following the first modulation symbol in the sequence of K modulation symbols. Each phase state in the trellis of FIG. 13 incorporates the information on the phase state in the symbol constellation and, additionally, whether the phase state has been arrived via clockwise phase rotation (+), counter-clockwise phase rotation (−), or zero-phase rotation (0). As illustrated in FIG. 13, all branches realizing two consecutive zero-phase rotations are blocked, following the mapping rules of Table 1. Obviously, if another branch is blocked by the mapping rules in the transmitter, the same branch is blocked in the receiver trellis as well. Furthermore, only branches that realize the phase transition 0, +π/2, and −π/2 may be enabled in the trellis. The procedure of FIG. 10, with or without the phase error correction of FIG. 12, is directly applicable to the trellis of FIG. 13, as well as the above-described other embodiments of FIG. 10.

Let us then compare the performance of the above-described modulation method with the QPSK modulation that is considered as a reference. As already discussed above, the reduced PAPR is one of the main advantages of the proposed modulation method. This reduction has been observed to facilitate maximizing an output power by as much as 2.7 decibels (dB) for large allocation sizes (multi-carrier symbols with many sub-carriers). Even with smaller allocation sizes (less sub-carriers), performance improvement can be observed. Further, it has been observed that when the phase noise and the channel response is included in the evaluation, the proposed modulation method (without oversampling) outperforms the QPSK, given that the phase error correction described above is implemented. It should be noted that although oversampled transmission with the excess band(s) can be utilized in the transmitter, the receiver can operate without using the subcarriers in the excess band, allowing adjacent channels to have overlapping excess bands without affecting the performance. Finally, a non-coherent detection comparison between the proposed modulation method (without oversampling) and QPSK is evaluated. It has been observed that the QPSK has an error floor while the error of the proposed modulation method decreases when a signal-to-noise power ratio (SNR) increases. It can be concluded that the proposed modulation method outperforms the QPSK particularly in the higher SNR range. Even in the lower SNR range, the SNR difference to achieve 10% block error rate (BLER) between the proposed modulation method and the QPSK is lower than the gain in the maximum output power, thereby making the proposed modulation method superior to the QPSK.

Figure 14:
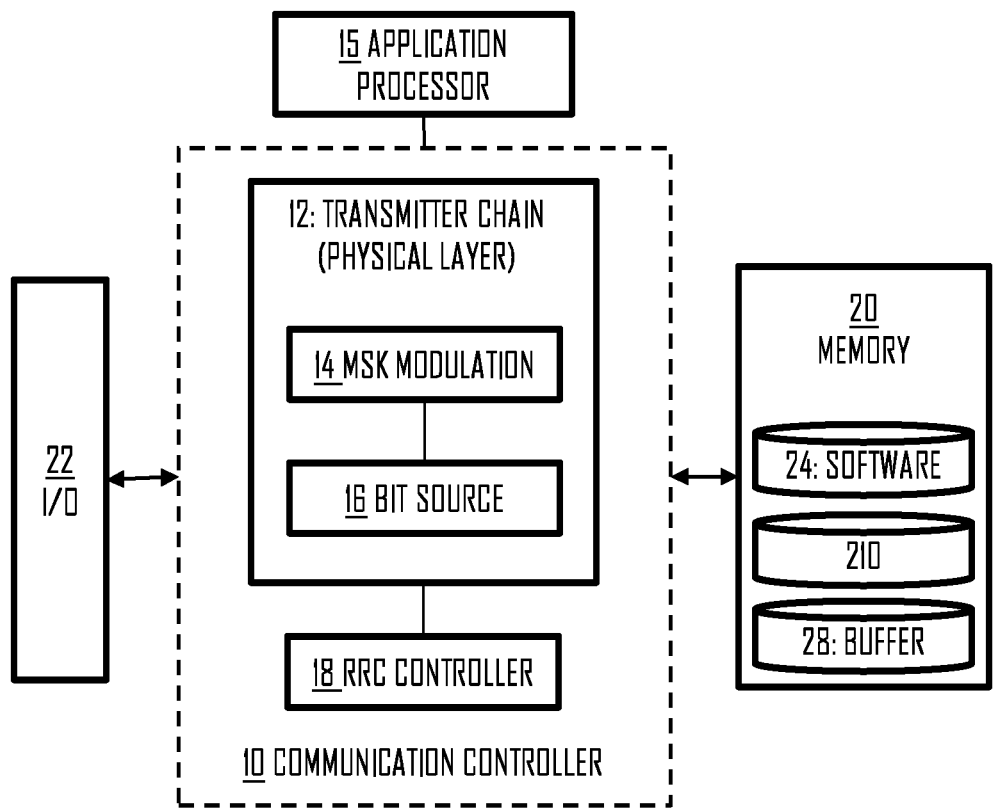
FIGS. 14 and 15 illustrate block diagrams of embodiments of apparatuses configured to carry out the respective processes of FIGS. 2 and 10.

FIG. 14 illustrates an apparatus comprising a processing circuitry, such as at least one processor, and at least one memory 20 including a computer program code (software) 24, wherein the at least one memory and the computer program code (software) are configured, with the at least one processor, to cause the apparatus to carry out the process of FIG. 2 or any one of its embodiments described above. The apparatus may be for a transmitter such as a terminal device 100, 101, 102. The apparatus may be a circuitry or an electronic device realizing some embodiments of the invention in the transmitter. The apparatus carrying out the above-described functionalities may thus be comprised in such a device, e.g. the apparatus may comprise a circuitry such as a chip, a chipset, a processor, a micro controller, or a combination of such circuitries for the transmitter. The at least one processor or a processing circuitry may realize a communication controller 10 controlling radio communications with the cellular network infrastructure and/or with other terminal devices or peer devices of the transmitter. The communication controller may be configured to establish and manage radio connections and transfer of data over the radio connections, including transmission by using the above-described modulation method.

In embodiments where the transmitter is the terminal device, the communication controller may comprise a radio resource control (RRC) controller 18 configured to manage RRC connections with the access node 104, for example, and other access nodes of the cellular communication system. The features of RRC connections are described in greater detail in 3GPP specifications for LTE and 5G, for example. In other networks, a similar radio controller may be implemented for managing connections with other radio devices.

The communication controller may further comprise a transmitter chain 12 configured to convert data bits to be transmitted into a stream of multi-carrier symbols, wherein each multi-carrier symbol carries modulation symbols carrying information on the data bits and signalling bits. The transmitter chain may comprise a bit source 16 configured to convert the data bits and the signalling bits into a stream or a bit sequence to be input to a modulator 14. The modulator may implement the modulation method according to any one of the above-described embodiments and, accordingly, pick blocks of N bits from the bit sequence and convert the blocks into sequences of K modulation symbols, as described above in connection with FIG. 2 or any one of its embodiments.

The memory 20 may be implemented using any suitable data storage technology, such as semiconductor-based memory devices, flash memory, magnetic memory devices and systems, optical memory devices and systems, fixed memory and removable memory. The memory 20 may comprise a database 210 storing the mapping rules for the modulation method, as described above. The memory 20 may further store a data buffer 28 for data to be transmitted from the towards the receiver.

The apparatus may further comprise a communication interface 22 comprising hardware and/or software for providing the apparatus with radio communication capability with one or more access nodes, as described above. The communication interface 22 may include, for example, an antenna, one or more radio frequency filters, a power amplifier, and one or more frequency converters. The communication interface 22 may comprise hardware and software needed for realizing the radio communications over the radio interface, e.g. according to specifications of an LTE or 5G radio interface.

The apparatus of FIG. 14 may further comprise an application processor 15 operating as a source for application data to be transmitted. The application data may relate to a primary purpose of an apparatus comprising the transmitter. Such an apparatus may be a mobile phone, a tablet computer, a smart watch, or another personal communication device, or it may be a sensor device or another industrial device with cellular communication capability. Accordingly, the application data may comprise various data.

Figure 15:
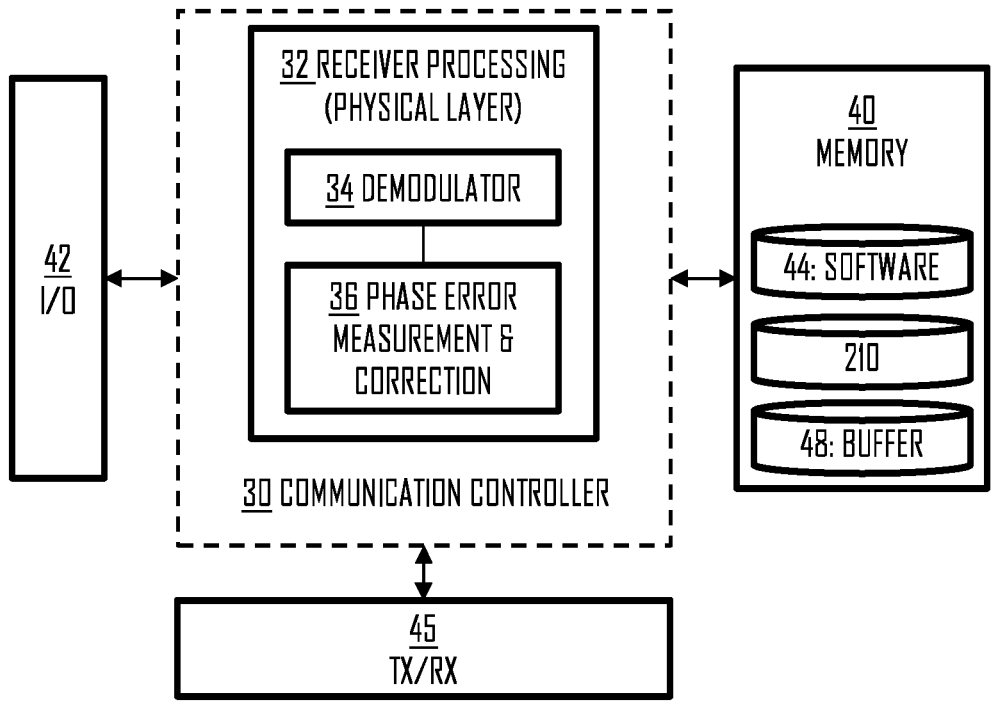

FIG. 15 illustrates an apparatus comprising a processing circuitry, such as at least one processor, and at least one memory 40 including a computer program code (software) 44, wherein the at least one memory and the computer program code (software) are configured, with the at least one processor, to cause the apparatus to carry out functions of the receiver in the process of FIG. 10 or any one of its embodiments described above. The apparatus may be for the access node 104, for example. The apparatus may be a circuitry or an electronic device realizing some embodiments of the invention in the access node. The apparatus carrying out the above-described functionalities may thus be comprised in such a device, e.g. the apparatus may comprise a circuitry such as a chip, a chipset, a processor, a micro controller, or a combination of such circuitries for the access node. In other embodiments, the apparatus is the access node. The at least one processor or a processing circuitry may realize a communication controller 30 controlling communications with the cellular network infrastructure in the above-described manner. The communication controller may be configured to establish and manage radio connections and transfer of data over the radio connections.

The communication controller 30 may comprise an RRC controller 32 configured to establish, manage, and terminate radio connections with terminal devices served by the access node. The RRC controller 32 may be configured, for example, to establish and reconfigure the RRC connections with the terminal devices 100, 101. The RRC controller may have a physical layer connection (Layer 1) with the transmitter apparatus of FIG. 14.

The communication controller may comprise the above-described receiver chain 32 configured to perform the above-described functions of the receiver. The receiver chain comprises at least a demodulator configured to carry out the demodulation according to the embodiment of FIG. 10. In an embodiment, the receiver chain further comprises a phase error measurement and correction circuit 36 configured to carry out the phase error tracking and correction according to the embodiment of FIG. 12.

The memory 40 may be implemented using any suitable data storage technology, such as semiconductor-based memory devices, flash memory, magnetic memory devices and systems, optical memory devices and systems, fixed memory and removable memory. The memory 40 may comprise a database 210 storing the mapping rules for the modulation method to enable the demodulation of the modulation symbols and retrieval of the bit sequence transmitted by the transmitter.

The apparatus may further comprise a radio frequency communication interface 45 comprising hardware and/or software for providing the apparatus with radio communication capability with the terminal devices, as described above. The communication interface 45 may include, for example, an antenna array, one or more radio frequency filters, a power amplifier, and one or more frequency converters. The communication interface 42 may comprise hardware and software needed for realizing the radio communications over the radio interface, e.g. according to specifications of an LTE or 5G radio interface.

The apparatus may further comprise another communication interface 42 for communicating towards the core network and other access nodes. The communication interface may support respective communication protocols of the cellular communication system to enable communication with other access nodes, with other nodes of the radio access network, and with nodes in the core network and even beyond the core network. The communication interface 42 may comprise necessary hardware and software for such communications.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIG. 2, 10, or any of the embodiments thereof may also be carried out in the form of one or more computer processes defined by one or more computer programs. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus comprising at least one processor and at least one memory including computer program code, the at least one memory and computer program code configured to, with the at least one processor, cause the apparatus to perform at least:
  store a database for mapping rules for mapping a block of N bits into M modulation symbol phase transitions, wherein a phase transition between consecutive modulation symbols is limited to less than or equal to $\mp\pi/2$, wherein M is smaller than N, and wherein M is the smallest number required for realizing $2^N$ different phase-transition combinations;
  receive a multi-carrier symbol comprising a sequence of K modulation symbols and acquiring M modulation symbols from the sequence of K modulation symbols;
  determine an initial phase before a phase transition leading to the first symbol in the M modulation symbols;
  generate, by using the mapping rules, a trellis from the determined initial phase to the possible phase states of the M modulation symbols;
  measure a phase of the first symbol of the M modulation symbols, computing a distance of the measured phase to each possible phase state of the first modulation symbol in the trellis, and selecting a phase state having the shortest distance to the measured phase;
  determine, on the basis of the mapping rules and the selected phase state, possible states of the second symbol of the M modulation symbols, measuring a phase of the second symbol of the M modulation symbols, computing a distance of the measured phase to each possible phase state of the second modulation symbol, and selecting a phase state having the shortest distance to the measured phase;
  upon determining phases of all M modulation symbols, map phase transitions between the initial phase and the selected phases of the all M modulation symbols to N bits by using the mapping rules and outputting the N bits.

2. The apparatus of claim 1, wherein the apparatus is caused to perform phase error correction by reducing a phase proportional to the distance between the measured phase of the first symbol and the selected phase state from a phase of the second symbol before measuring the phase of the second symbol.

3. The apparatus of claim 2, wherein the apparatus is caused to estimate the phase error from the sequence of modulation symbols without a reference signal.

4. The apparatus of claim 1, wherein the mapping rules allow a phase transition between consecutive modulation symbols to be either 0, $-\pi/2$, or $+\pi/2$.

5. The apparatus of claim 1, wherein M=2 and N=3.

6. The apparatus of claim 1, wherein the apparatus is caused to omit computation of distance to such phase states of the M modulation symbols that are not allowed by the mapping rules.

* * * * *